United States Patent [19]

Brinkmeier

[11] Patent Number: 4,871,347
[45] Date of Patent: Oct. 3, 1989

[54] APPARATUS FOR FORMING A FLEXIBLE TUBING FROM A SINGLE-PLY OR MULTI-PLY WEB

[75] Inventor: Friedhelm Brinkmeier, Lengerich, Fed. Rep. of Germany

[73] Assignee: Windmoller & Holscher, Lengerich, Fed. Rep. of Germany

[21] Appl. No.: 122,297

[22] Filed: Nov. 18, 1987

[30] Foreign Application Priority Data

Nov. 25, 1986 [DE] Fed. Rep. of Germany ....... 3640219

[51] Int. Cl.$^4$ ............................................. B31C 13/00
[52] U.S. Cl. .................................... 493/302; 493/248; 493/439; 493/440
[58] Field of Search ............... 493/193, 196, 195, 201, 493/248, 252, 254, 302, 436, 438, 440, 446, 447, 439

[56] References Cited

U.S. PATENT DOCUMENTS

| | | | |
|---|---|---|---|
| 1,838,704 | 12/1931 | Potdevin | 493/248 |
| 1,975,121 | 10/1934 | Potdevin | 493/302 |
| 2,346,191 | 4/1944 | Scholtz et al. | 493/352 |
| 2,701,989 | 2/1955 | Hayward et al. | 493/302 |
| 4,519,185 | 5/1985 | Horn et al. | 493/302 |

FOREIGN PATENT DOCUMENTS 1162544 3/1962 Fed. Rep. of Germany .

*Primary Examiner*—Robert P. Olszewski
*Assistant Examiner*—Robert Showalter
*Attorney, Agent, or Firm*—Fleit, Jacobson, Cohn, Price, Holman & Stern

[57] ABSTRACT

Apparatus for forming a flexible tubing (S) from a single-ply or multi-ply web (B) as it is continuously advanced includes two size-defining metal plates (9, 10) which define the width of the flattened tubing and are substantially parallel to each other and are movably mounted in the machine frame (1, 2, 3) and have receiving end portions about which the web is deflected to raise edge portions of the web which are to be infolded to overlap each other. The plates are adjustable by a screw (34) or the like to control the distance between their receiving end portions. The plates are provided at their delivery end portions with straps (17) or the like for controlling the distance between the plates. In order to permit after a change of size a simple adjustment of the size even when the apparatus is in operation, each of the two straps or arms (17) has a free end portion, which is longitudinally slidably guided relative to the machine frame (1, 2, 3) by guides (27, 28) and fixed in position relative to the machine frame.

3 Claims, 5 Drawing Sheets

APPARATUS FOR FORMING A FLEXIBLE TUBING FROM A SINGLE-PLY OR MULTI-PLY WEB

BACKGROUND OF THE INVENTION

1. Field of the Invention

This invention relates to apparatus for forming a flexible tubing from a single-ply or multiply web as it is continuously advanced, comprising two size-defining metal plates, which define the width of the flattened tubing and are substantially parallel to each other and are movably mounted in the machine frame and have receiving or upstream end portions about which the web is deflected to raise edge portions of the web which are to be infolded to overlap each other, and which plates are adjustable by a screw or the like to control the distance between their receiving end portions, whereas the plates are provided at their delivery or downstream end portions with straps or the like for controlling the distance between the plates.

2. Description of the Prior Art

German Patent Specification No. 11 62 544, expressly incorporated herein by reference, discloses such an apparatus, which is usually described as a tubing-forming station in machines for making flexible tubing. In German Patent Specification No. 11 62 544 it has not been stated how delivery end portions of the size-defining plates are fixed in their adjusted position. In apparatus of the known kind the delivery end portions of the size-defining plates are usually interconnected by straps, which can be fixed in an adjusted position by screw means. If the distance between the delivery end portions of the size-defining plates is to be corrected because a different size has been selected, the feeding of the web must be interrupted and the screw means must be loosened and must be re-tightened after the adjustment to the new position. Such complicated and time-consuming adjusting work involving a standstill of the machine may have to be performed several times.

SUMMARY OF THE INVENTION

It is an object of the invention to improve the known apparatus of the kind described first hereinbefore in that the size-defining plates can be adjusted in a simple manner also while the apparatus is in operation when a different size has been selected.

In an apparatus of the kind described first hereinbefore that object is accomplished in accordance with the invention in that each of the two straps or arms has a free end portion, which is longitudinally slidably guided relative to the machine frame by guiding means and is adapted to be fixed in position relative to the machine frame. When the screw mechanism associated with the receiving end portions has been operated to adjust the size-defining plates to a new size, the delivery end portions of the size-defining plates are adjusted to the new size by means of the arms or straps, which are preferably pivoted to said plates. When the operation of the apparatus has been started and it is found that the web does not move properly or is wandering, the required correction can be made during operation by a corresponding adjustment of the straps or arms.

The guiding means suitably comprise slots, which are formed in the straps or arms, and guide pins, which are fixed to the machine frame and extend through the slots. The straps or arms may be clamped in position by nuts, which are screwed on the guide pins.

Screw drives or the like may be provided for effecting an adjustment of the straps or arms relative to the machine frame.

In a particularly preferred embodiment, the guide pins are secured to carriages, which slidably mounted in tracks of the machine frame and can be adjusted along said tracks by screw drives, servo-motors or the like. For the selection of a size, the carriage may be provided with a scale, which has graduations corresponding to the various sizes, and the arms or straps may be provided with a mark for registering with said graduations. In that case the carriage must be moved to an initial position before the size adjustment can be effected. If a wandering of the web is observed during operation, a corresponding correction can be effected by an adjustment of the carriage to which the arm or strap has been clamped for the size adjustment.

To permit also an adjustment of the arms or straps to the required elevation, a further feature of the invention resides in that the tracks for the carriage are provided in a slidable block, which is adjustable in vertical tracks of the machine frame by a screw drive, servomotors or the like.

DETAILED DESCRIPTION OF THE PREFERRED EMBODIMENT

Figure 1:
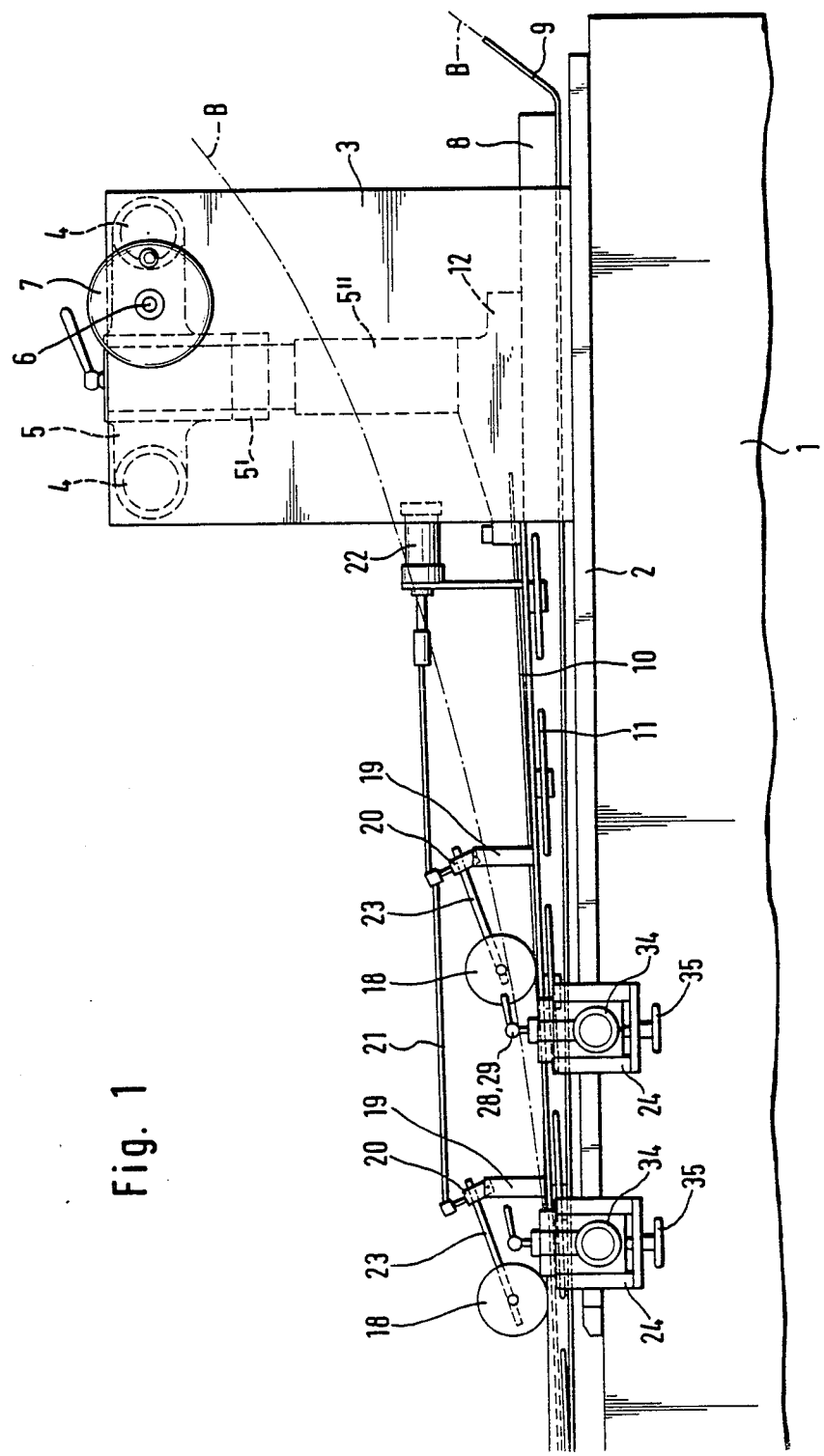
FIG. 1 is a side elevation showing the tubing-forming station.
Figure 2:
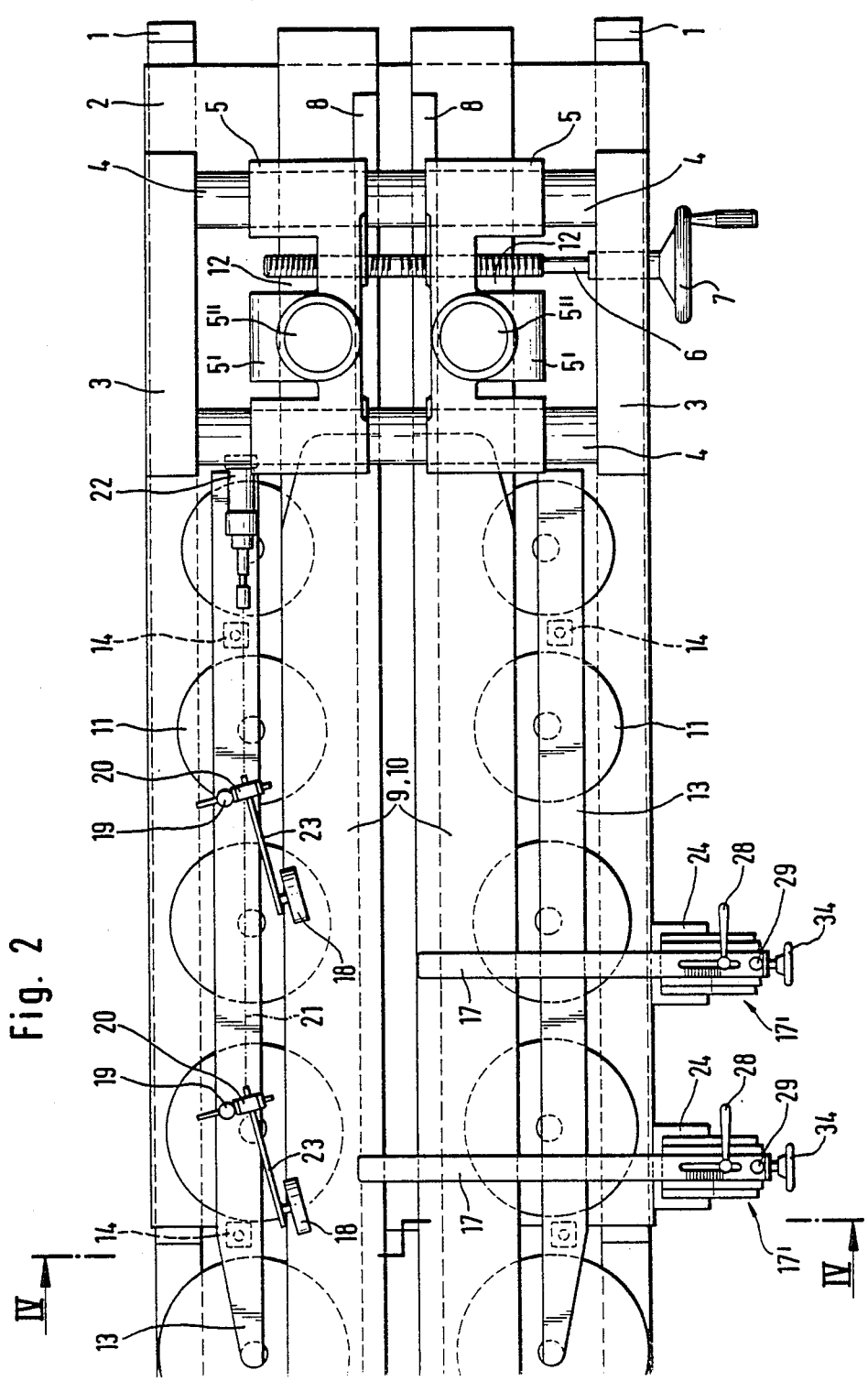
FIG. 2 is a top plan view showing the tubing-forming station of FIG. 1.

An illustrative embodiment of the invention will now be explained in more detail with reference to the drawing.

The drawings illustrate a tubing forming station, which is incorporated in a machine for making flexible tubing and comprises two laterally disposed supporting frames 1, which carry a table top 2. Two frame portions 3 are secured to the table top 2 and are interconnected by guide columns 4, in which two carriages 5 are slidably mounted. Each of the carriages 5 comprises a clamp-on bushing 5', by means of which two carrying columns 5" can be clamped to the carriage. At that end of each carrying column 5" which faces the table top 2, each carrying column 5" is formed with a mounting shoe 12, which is provided with a supporting wedge 8, which is fixed to the shoe 12. The distance between the supporting wedges 8 at the receiving or upstream end of the machine is adjustable by means of an adjusting screw 6 and an associated handwheel 7.

Figure 3:
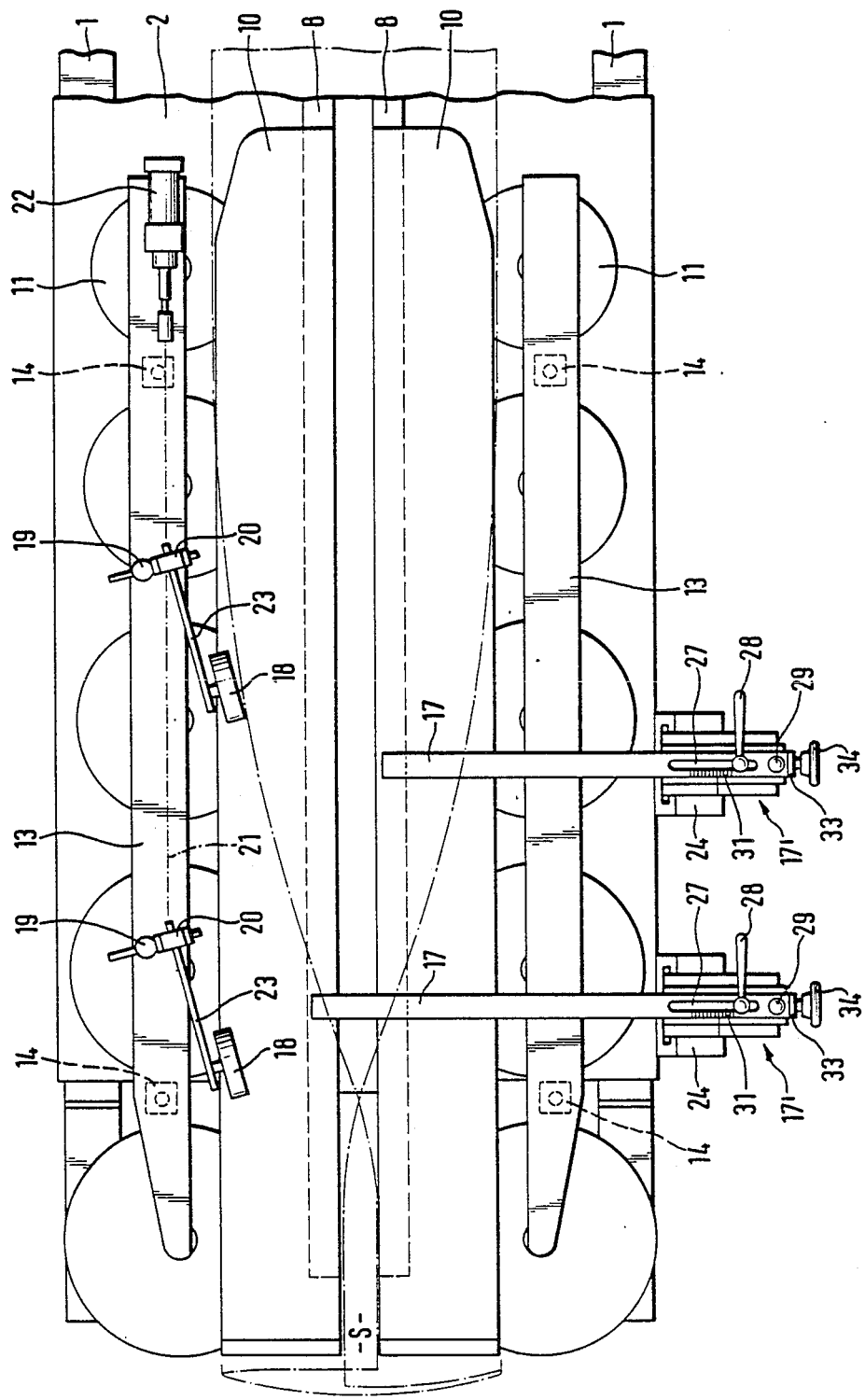
FIG. 3 is a simplified representation of the station shown in FIG. 2.
Figure 4:
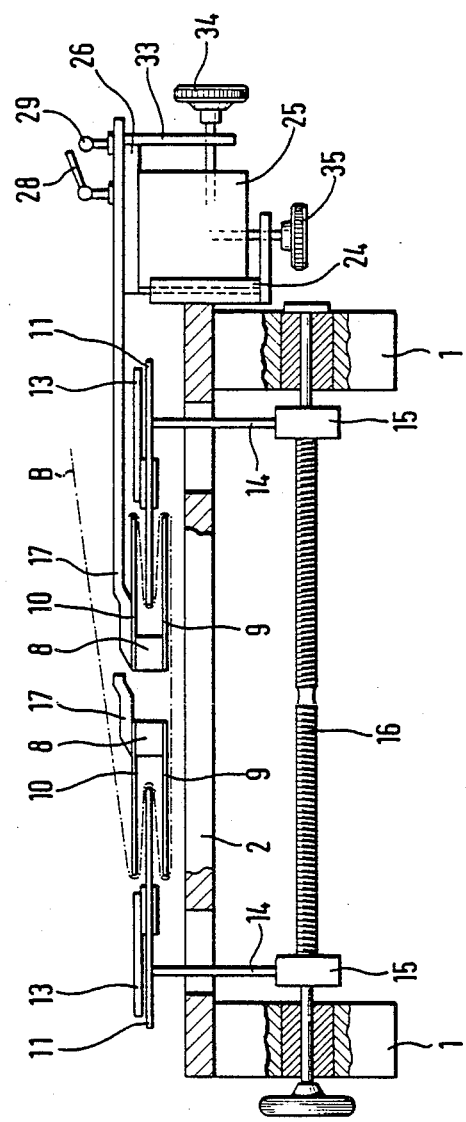
FIG. 4 shows the station of FIG. 2 in a sectional view taken on line IV—IV in FIG. 2.

As is particularly apparent from FIG. 4 a lower folding plate 9 and an upper folding plate 10 are fixedly secured to each supporting wedge 8. Said folding plates 9, 10 and infolding discs 11, which protrude from opposite sides into the space between respective upper and lower folding plates 10, 9, are used to form side gussets in the web B when the latter has been folded over in known manner to form a tubing as indicated, for example, by the chain-dotted lines in FIG. 3. The depth of said side gussets will depend on the depth of penetration of the infolding discs 11. For that purpose the infolding discs 11 are freely rotatably mounted on two disc carriers 13, which are provided with stems 14, which at one end are connected to threaded nuts 15. Each nut 15 surrounds a screw 16, which is formed with oppositely handed screw threads. The screw 16 can be rotated by a handwheel so as to adjust the discs 11 relative to each other. In addition to the adjustment of the discs 11, an adjustment of the supporting wedges and of the folding plates 9, 10 on one side of the machine relative to the folding plates 9, 10 on the other side of the machine can be effected at the delivery or downstream end of the machine by means of two adjusting arms 17, which at one end are fixedly secured to respective supporting wedges 8.

From the path for the web illustrated in FIG. 3 it is apparent that the web B has not yet been entirely folded over to form a tubing S at the point at which the adjusting arms 17 are connected to the supporting wedges 8 so that the arms 17 can freely protrude outwardly over one side of the web which is being folded over. The arms are carried at their outer ends by an adjusting mechanism 17' for displacing the arms. While the drawings are not necessarily to scale, there should obviously be sufficient height between the arms 17 and plate 10 (on the one side of the machine) to allow passage of one side of the web which is being folded over. When the web B has been partly or entirely folded to form a tubing, it must be ensured that the web will not be unfolded by the action of restoring forces of the web. This is ensured by the provision of pressure-applying rollers 18, which are mounted in respective mounting levers 23. Each mounting lever is fixedly secured to a pivoted block 20. The pivoted blocks 20 are mounted in respective brackets 19, which are carried by the disc holders 13.

All pivoted blocks are interconnected by a tie rod 21, which constitutes an extension of the piston rod of a piston-cylinder unit 22, which is operable to raise and lower the pressure-applying rollers 18. For the sake of simplicity only the rollers 18 disposed on one side of the machine are shown although rollers 18 are actually provided on both sides in the same manner. It will be understood that each pressure-applying roller 18 can be individually raised by an individually associated piston-cylinder unit if the common adjustment shown in the drawings is not desired.

Figure 5:
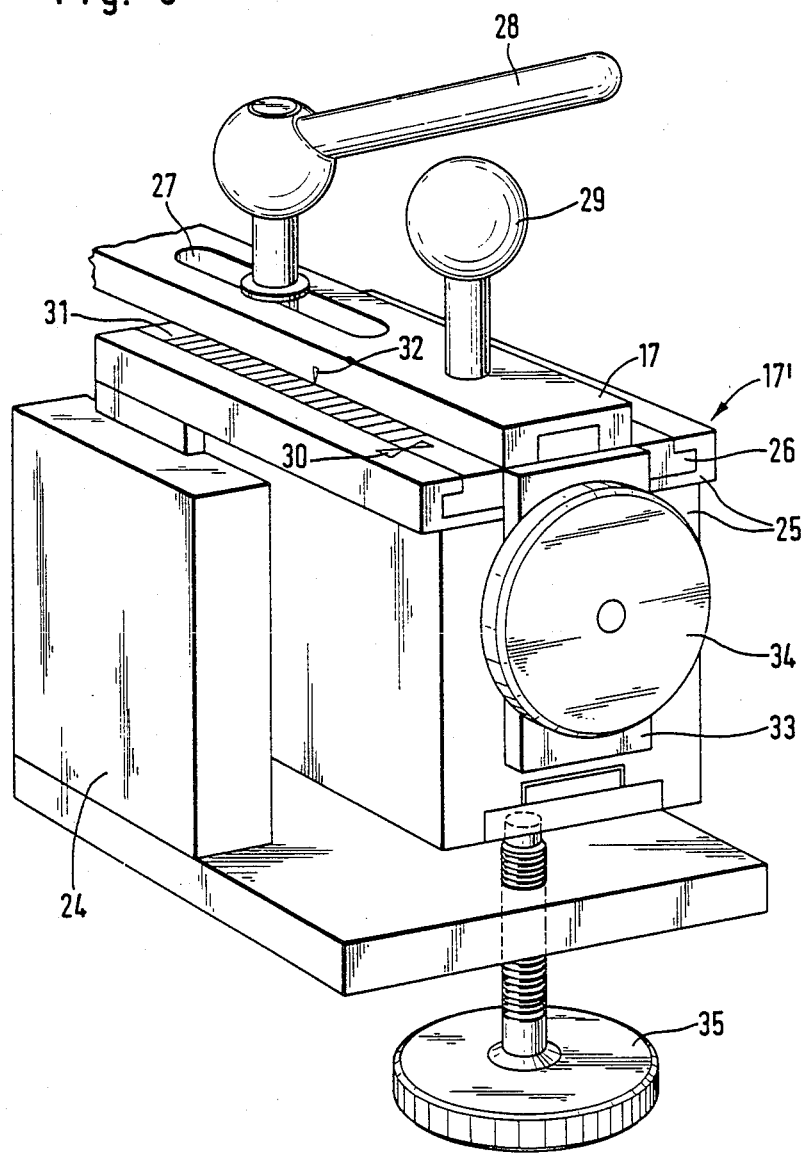
FIG. 5 is a perspective view showing the mechanism for adjusting the lugs or arms.

As has been mentioned hereinbefore, the folding plates 9 and 10 can be adjusted at the downstream end of the machine by the adjusting mechanisms 17', one of which is shown in perspective in FIG. 5. In accordance therewith each adjusting mechanism comprises a track member 24, which is fixedly secured to the table top 2 and has tracks in which a profiled block 25 is guided, which is adapted to be raised and lowered by an elevation-adjusting screw 35. The profiled block 25 is provided on its top surface with a horizontal track, which receives a ruler 26, which at that end that is remote from the machine is provided with a holder 33. By means of the adjusting screw 34 the holder 33 is adjustable relative to the block so as to change the position of the ruler 26 relative to the block 25 along the horizontal track. In the initial position, the two marks 30 are the track member 24 and the ruler 26, respectively, are in register.

The adjusting arm 17 is disposed above the ruler 26 and at that end which is not shown in FIG. 5 is connected to a supporting wedge 8. The adjusting arm 17 is formed with a slot 27. A locking lever 28 is non-rotatably connected to a screw, which extends through the slot 27 and is adapted to be screwed into the ruler 26. When the lever 28 has been unscrewed, the arm 17 can be displaced relative to the ruler 26 to the desired extend by means of the handle 29. It will be understood that the handwheel 7 must be operated at the same time to adjust the upstream ends of the plates 9 and 10. As a result, the position of the reference mark 32 on the arm 17 relative to the scale 31 on the ruler indicates the size or tubing width to which the apparatus has been adjusted. Before the adjustment to that selected size, the adjusting screw 34 must be rotated until the marks 30 register in the initial position. When the machine is then started and it is found that the selected size has not exactly been adjusted and that the web is wandering, e.g., on one side, a correction relative to the initial position can be effected during operation by means of one or both adjusting mechanisms 17', whereas there is no need for an adjustment by means of the handwheel 7. It will be sufficient to effect that adjustment by the adjusting mechanisms 17' only adjacent to the downstream or delivery end of the folding plates.

It will be understood that the manually operable adjusting mechanisms 17' may be replaced by motors, which may be controlled, e.g., by sensors for scanning the web. It is essential that the supporting wedges 8 can be adjusted during operation in case of need for a correction of the position of the folding plates 9 and 10 relative to each other without a need for stopping the machine. For that purpose the adjusting arms 17 of the adjusting mechanisms 17' must obviously be connected to the supporting wedges 8 in that region in which the web has not yet been entirely folded to form a tubing. Also, the arms 17 may be pivotally attached to the wedges.

I claim:

1. Apparatus for forming a flexible tubing from a single-ply or multi-ply web as the web is continuously advanced, said apparatus comprising:
   a machine frame,
   two size-defining metal plates to define the width of the flattened tubing and said plates extending substantially parallel to each other and being movably mounted in said machine frame, said plates having receiving end portions about which the web is deflected to raise edge portions of the web which are in-folded to overlap each other, and adjustment means for controlling a distance between said receiving end portions, and said plates being provided at delivery end portions with arms for controlling a distance between said plates,
   guide means for longitudinally slidably guiding a free end portion of each of said arms relative to said machine frame and said guide means being adapted to be fixed in position relative to said machine frame, and said guide means including slots formed in said arms, and guide lever members fixed to said machine frame, said guide lever members extending through said slots and being secured to slidable members, said slidable members being slidably mounted in tracks of said machine frame and means for moving said slidable members along said tracks.

2. Apparatus according to claim 1, wherein said means for moving are provided for an adjustment of said arms relative to said machine frame.

3. Apparatus according to claim 1, wherein said tracks for said slidable members are provided in a slidable block, said slidable block being adjustable in vertical tracks of said machine frame by a screw drive.

* * * * *